US010841127B1

(12) United States Patent
Greer et al.

(10) Patent No.: US 10,841,127 B1
(45) Date of Patent: Nov. 17, 2020

(54) TRACTOR TRAILER VEHICLE AREA NETWORK WITH TRAILER SUB-NETWORK

(71) Applicant: Sensata Technologies, Inc., Attleboro, MA (US)

(72) Inventors: John Greer, Randalstown (IE); David Galbraith, Comber (IE); Pete Tasker, Staverton (IE); Philip Catherwood, Coleraine (IE); Alan Millen, Coleraine (IE); Paul McGrotty, Newtownabbey (IE)

(73) Assignee: Sensata Technologies, Inc., Attleboro, MA (US)

( * ) Notice: Subject to any disclaimer, the term of this patent is extended or adjusted under 35 U.S.C. 154(b) by 0 days.

(21) Appl. No.: 16/855,410

(22) Filed: Apr. 22, 2020

Related U.S. Application Data

(60) Provisional application No. 62/849,339, filed on May 17, 2019, provisional application No. 62/849,343, (Continued)

(51) Int. Cl.
*H04L 12/40* (2006.01)
*H04W 4/44* (2018.01)
(Continued)

(52) U.S. Cl.
CPC .............. *H04L 12/40* (2013.01); *H04L 12/44* (2013.01); *H04L 12/46* (2013.01); *H04W 4/40* (2018.02);
(Continued)

(58) Field of Classification Search
CPC ......... H04L 12/40; H04L 12/44; H04L 12/46; H04L 2012/40293; H04L 2012/40215;
(Continued)

(56) References Cited

U.S. PATENT DOCUMENTS 4,685,540 A 8/1987 Rath et al.
4,850,454 A 7/1989 Korody
(Continued)

FOREIGN PATENT DOCUMENTS

CA 2698459 9/2011
DE 102014015394 A1 * 4/2016 ............ H04W 84/12
(Continued)

OTHER PUBLICATIONS

International Search Report and Written Opinion of PCT Application No. PCT/US2020/029249, dated Jun. 19, 2020, 11 pages.

*Primary Examiner* — Dale W Hilgendorf
(74) *Attorney, Agent, or Firm* — Burns & Levinson, LLP; Joseph M. Maraia; George N. Chaelas

(57) ABSTRACT

A method establishes a vehicle area network on a vehicle having a tractor with a tractor wireless hub, the tractor being connected to a first trailer having a first trailer wireless hub. The method activates the tractor hub and the first trailer wireless hub, and shares credentials between the tractor wireless hub and the first trailer wireless hub in accordance with out of band pairing techniques. Typically, the tractor wireless hub acts as an access point for the vehicle area network but the access point can be centralized by: searching down a length of the vehicle to determine relative locations of the tractor wireless hub, the first trailer wireless hub and the second trailer wireless hub; determining a centrally located hub based on the locations; and establishing the centrally located hub as the access point.

19 Claims, 12 Drawing Sheets

Related U.S. Application Data filed on May 17, 2019, provisional application No. 62/849,344, filed on May 17, 2019, provisional application No. 62/849,347, filed on May 17, 2019, provisional application No. 62/944,981, filed on Dec. 6, 2019, provisional application No. 62/951,561, filed on Dec. 20, 2019, provisional application No. 62/951,594, filed on Dec. 20, 2019, provisional application No. 62/951,660, filed on Dec. 20, 2019, provisional application No. 62/951,734, filed on Dec. 20, 2019.

(51) Int. Cl.
  *H04W 4/46* (2018.01)
  *H04L 12/46* (2006.01)
  *H04L 12/44* (2006.01)
  *H04W 4/40* (2018.01)

(52) U.S. Cl.
  CPC ............... *H04W 4/44* (2018.02); *H04W 4/46* (2018.02); *H04L 2012/40215* (2013.01); *H04L 2012/40273* (2013.01); *H04L 2012/40293* (2013.01)

(58) Field of Classification Search
  CPC ............ H04L 2012/40273; H04W 4/40; H04W 4/46; H04W 4/44
  See application file for complete search history.

(56) References Cited

U.S. PATENT DOCUMENTS

| | | | |
|---|---|---|---|
| 6,042,079 A | 3/2000 | Hogenkamp | |
| 6,257,374 B1 | 7/2001 | Strzelczyk et al. | |
| 6,276,494 B1 | 8/2001 | Ward et al. | |
| 6,481,539 B1 | 11/2002 | Shaw et al. | |
| 7,307,514 B2 | 12/2007 | McAden | |
| 8,310,356 B2 | 11/2012 | Evans et al. | |
| 10,518,590 B2 | 12/2019 | Stewart et al. | |
| 2002/0061758 A1* | 5/2002 | Zarlengo et al. | H04W 84/12 455/517 |
| 2004/0263324 A1 | 12/2004 | Sanchez et al. | |
| 2006/0090968 A1 | 5/2006 | Taylor et al. | |
| 2006/0149440 A1 | 7/2006 | Pettersson et al. | |
| 2007/0288294 A1* | 12/2007 | Olsen, III et al. | G06Q 10/06 701/472 |
| 2008/0157944 A1 | 7/2008 | Breen | |
| 2011/0168619 A1 | 7/2011 | Kuehnrich et al. | |
| 2011/0240410 A1 | 10/2011 | Barrio et al. | |
| 2016/0005712 A1 | 1/2016 | Tran et al. | |
| 2016/0019497 A1* | 1/2016 | Carvajal | H04W 4/44 701/519 |
| 2016/0057122 A1* | 2/2016 | van Bergeijk | H04L 2012/40215 |
| 2017/0245321 A1* | 8/2017 | Dieckmann et al. | H04W 84/12 |
| 2017/0289254 A1* | 10/2017 | Dieckmann et al. | H04W 84/12 |
| 2018/0099712 A1 | 4/2018 | Bean et al. | |
| 2018/0229786 A1 | 8/2018 | Weaver et al. | |
| 2019/0111984 A2* | 4/2019 | Bean et al. | H04L 12/4625 |
| 2019/0208552 A1* | 7/2019 | Dieckmann et al. | H04W 4/40 |
| 2019/0223007 A1* | 7/2019 | Weaver | H04L 12/40 |
| 2020/0120509 A1* | 4/2020 | Stitt et al. | H04W 4/40 |

FOREIGN PATENT DOCUMENTS

| | | |
|---|---|---|
| EP | 0869881 | 10/1998 |
| WO | 2018/075352 | 4/2018 |
| WO | 2018/075439 | 4/2018 |

* cited by examiner

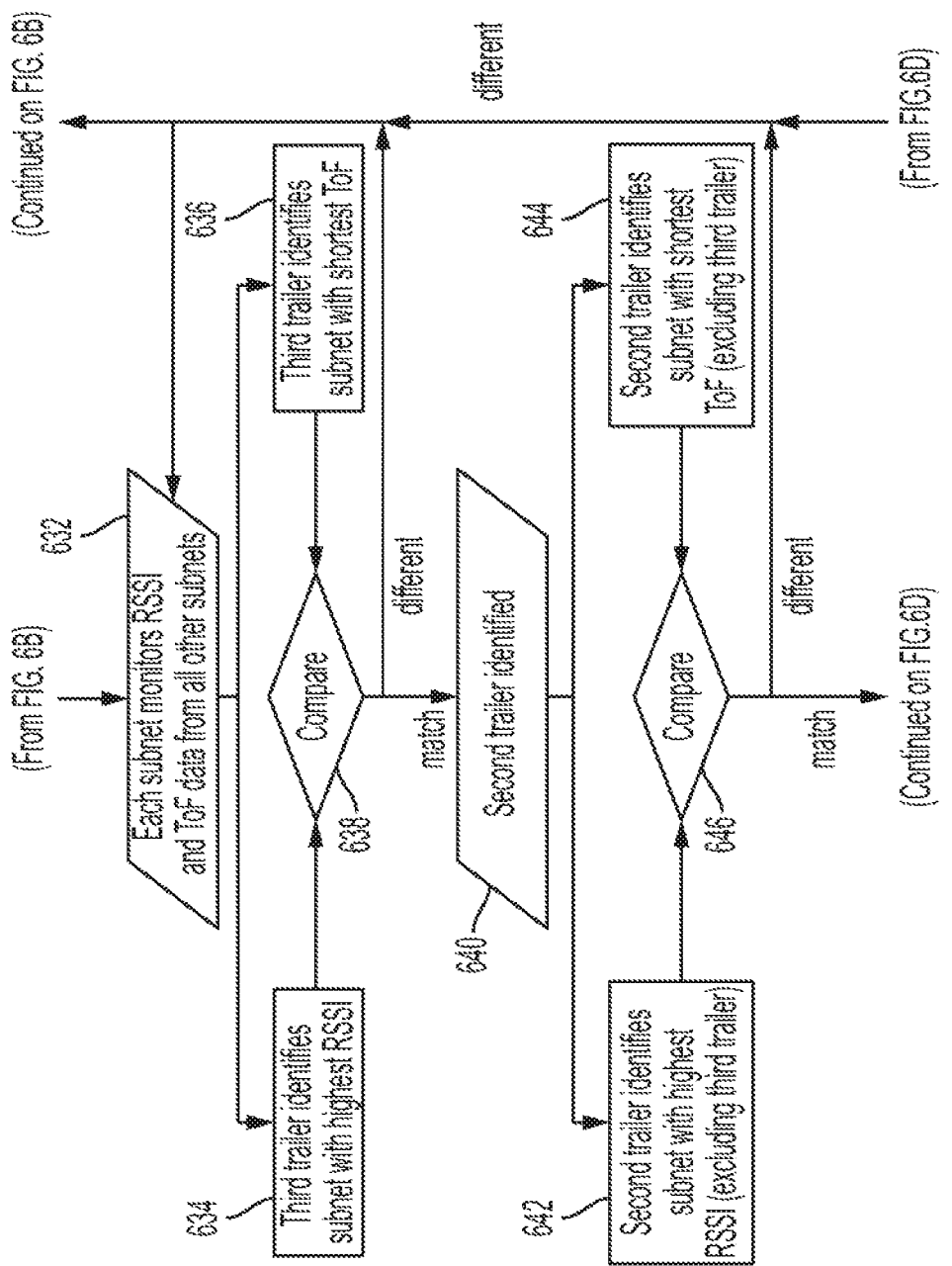

TRACTOR TRAILER VEHICLE AREA NETWORK WITH TRAILER SUB-NETWORK

CROSS-REFERENCE TO RELATED APPLICATION

This application claims priority to and the benefit of U.S. Provisional Patent Application No. 62/951,734, filed Dec. 20, 2019, U.S. Provisional Patent Application No. 62/849,347, filed May 17, 2019, U.S. Provisional Patent Application No. 62/951,561, filed Dec. 20, 2019, U.S. Provisional Patent Application No. 62/849,344, filed May 17, 2019, U.S. Provisional Patent Application No. 62/951,594, filed Dec. 20, 2019, U.S. Provisional Patent Application No. 62/849,343, filed May 17, 2019, U.S. Provisional Patent Application No. 62/944,981, filed Dec. 6, 2019, U.S. Provisional Patent Application No. 62/849,339, filed May 17, 2019, and U.S. Provisional Patent Application No. 62/951,660, filed Dec. 20, 2019, each of which is incorporated herein by reference.

BACKGROUND

1. Technical Field

The subject disclosure relates to vehicle area networks in communication with subnetworks and sensors, and more particularly vehicle area networks for a tractor-trailer vehicle having one or more communication hubs to create sub-networks and provide telematics with quick, robust and easy connection of one or more trailers to a tractor of the tractor-trailer vehicle.

2. Background of the Related Art

In the United States, the Dwight D. Eisenhower National System of Interstate and Defense Highways, commonly known as the Interstate Highway System, is a network of controlled-access highways that forms part of the National Highway System in the United States. Construction of the Interstate Highway System was authorized by the Federal Aid Highway Act of 1956. The Interstate Highway System extends throughout the contiguous United States and has routes in Hawaii, Alaska, and Puerto Rico.

With great roads, trucking is an essential component of the economy infrastructure. Indeed, a tractor-trailer vehicle cruising down the Interstate Highway is common. Trucking is involved in the delivery of not only almost every consumer product but industrial products as well. Truck drivers are often independent drivers who may or may not own their own trailer but, in any case, contract to deliver one or more full-load or part-load trailers. Indeed, being a truck driver is one of the most common jobs in America.

A paradigm shift is on the horizon as the asphalt highway is integrated into the information age. Such vehicles will be equipped with a suite of technology to connect to the information superhighway and image the physical superhighway. The vehicles will form a virtual image of the road that is processed for navigation and control. The technology will include cameras, LIDAR, RADAR, sensors of all sorts, motors and of course a large processing capacity (e.g., processors, memory, power supplies etc.).

Problems of efficiency and timeliness with transport by tractor-trailer vehicle remain despite the longstanding and ubiquitous use. Mobile vehicles have been slow to beneficially utilize the potential benefits of interconnection and analysis. Other obstacles stem from the typical driver not being comfortable navigating use of sophisticated electronics or various equipment configurations that are simply not interoperable. Further, without drivers, many more tasks and maintenance activities must be automated. Thus, a need exists for easy, automatic connection and operation of vehicles with more sophisticated communication and networking technology on vehicles, particularly tractor-trailer vehicles.

Still further obstacles remain in that innovative hardware to solve longstanding problems has not yet been invented to solve such problems. For example, drivers may have to forage through large lots of trailers to find the desired trailer. In view of this, there is a need for hardware and a method to quickly and easily help the driver locate and connect to the desired trailer.

SUMMARY

In view of the above, the present disclosure is directed to systems and methods for establishing a vehicle area network on a vehicle having a tractor with a tractor wireless hub, the tractor being connected to a first trailer having a first trailer wireless hub. The subject technology includes the steps of: activating the tractor hub and the first trailer wireless hub; and sharing credentials between the tractor wireless hub and the first trailer wireless hub in accordance with out of band pairing techniques. The first trailer wireless hub can be activated by a power line connection being made between the tractor and the first trailer, with the credentials shared via the power line connection.

In one embodiment, the tractor wireless hub is activated by a key fob being in proximity to the tractor, or the driver pressing a button on the key fob and the like. The vehicle area network components may also be activated any time the tractor is running. When not running, the vehicle area network may be in sleep mode where the vehicle area network components only periodically check for activity that would prompt activation.

A pairing device can establish communication between the tractor wireless hub and a plurality of sensors on the tractor. Transmitter/receivers act as range extenders for relaying signals from the plurality of sensors to the tractor wireless hub. The vehicle area network including a tractor subnetwork based on the tractor wireless hub and a first trailer subnetwork based on the first trailer wireless hub, wherein the tractor or one of the trailer wireless hubs acts as an access point for the vehicle area network.

A second trailer can also be coupled to the first trailer, wherein the second trailer has a second trailer wireless hub that is activated upon a power line connection being made between the first and second trailers. With the additional trailer, the access point can be centralized by: searching down a length of the vehicle to determine relative locations of the tractor wireless hub, the first trailer wireless hub and the second trailer wireless hub; determining a centrally located hub based on the locations; and establishing the centrally located hub as the access point.

The method can also establish communication between the tractor wireless hub and a telematics device as well as communication between a plurality of sensors throughout the vehicle. By processing data from the plurality of sensors, proper action for the vehicle can be determined, whether the action be taken automatically in an autonomous vehicle, by the driver and/or by service personnel. Examples of possible proper action are: displaying a warning on a dashboard in the tractor; changing a tire; modifying an autonomous control of the vehicle; scheduling a maintenance appointment; and the like.

Still another embodiment of the present disclosure includes a method for automatically recognizing an order of a first and second trailer on a tractor to form a vehicle, the method comprising the steps of: creating a vehicle area network including a first subnetwork on the first trailer, a second subnetwork on the second trailer, and a wireless hub on the tractor and in communication with each subnetwork; capturing, by the wireless hub, a received signal strength indicators (RSSI) and a time of flight (ToF) from each subnetwork to form a set of data; determining a highest RSSI and lowest ToF in the set; and if the highest RSSI and the lowest ToF are from the first subnetwork, identifying the first trailer as being immediately adjacent the tractor.

The method can also include identifying the second trailer as being behind the first trailer if the highest RSSI and the lowest ToF are from the first subnetwork and no other subnetworks are present. When the vehicle includes a third trailer with a third subnetwork, the method can capturing, by the wireless hub, a RSSI and ToF from the third subnetwork and add the third subnetwork RSSI and ToF to the set of data. To further determine trailer order, the method determines a second highest RSSI and second lowest ToF in the set. If the second highest RSSI and the second lowest ToF are from the second subnetwork, identifying the second trailer as between the first trailer and the third trailer.

And yet another embodiment of the present invention includes a method for locating a trailer for a tractor-trailer vehicle by providing a beacon on the trailer that transmits a signal wirelessly to an external network. The beacon signal includes global positioning system (GPS) data indicating a location of the trailer so that the GPS data is sent from the external network to a tractor for use by the tractor. The display may include driving directions for review by the driver or execution by an autonomous vehicle. In one embodiment, the beacon includes a LED light that is activated when the tractor is within communication range of a communication hub on the tractor. Once the trailer is located, the method automatically pairs the communication hub with a subnetwork on the trailer to form a vehicle area network.

The subject technology is also directed to a tractor-trailer vehicle including a tractor that having at least four tires, two of which can be turned to steer a direction of travel of the tractor. A first wireless hub is integrated with the tractor and a trailer is removably connected to the tractor. The trailer has a front portion that is adapted to connect to the tractor, and a rear portion with at least two tires. A second wireless hub is integrated with the trailer. At least one sensor is integrated with the tractor and at least one sensor is integrated with the trailer. A telematics module is integrated with the trailer. In operation, the first wireless hub communicates with the second wireless hub by way of WiFi with a first network protocol, thereby establishing a first level of a vehicle area network (VAN) comprising the first wireless hub and the second wireless hub. The first wireless hub also establishes a first subnetwork in and around the tractor with a network protocol different than the first network protocol, and communicates with the first sensor via the first subnetwork, the first subnetwork being within a second level of the VAN. The second wireless hub establishes a second subnetwork in and around the trailer with the network protocol different than the first network protocol, that is separate and distinct from the first subnetwork, and communicates with the second sensor via the second subnetwork, the second subnetwork being within the second level of the VAN. The second wireless hub communicates data to the telematics unit wirelessly. The at least one sensor that is integrated with the trailer preferably includes a tire-pressure-measurement sensor that is located inside one of the at least two tires and communicates data to the second wireless hub wirelessly. Preferably, the tractor-trailer vehicle also includes a transmitter/receiver that is integrated with the trailer, and acts as a range extender for the at least one sensor when the at least one sensor and the second wireless hub communicate with one another.

It should be appreciated that the subject technology can be implemented and utilized in numerous ways, including without limitation as a process, an apparatus, a system, a device, a method for applications now known and later developed or a computer readable medium. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the drawings.

FIG. 6C is a portion of a flowchart for automatically ordering the trailers of the vehicle of FIG. 5 in accordance with the subject technology.

DETAILED DESCRIPTION OF PREFERRED EMBODIMENTS

Figure 1:
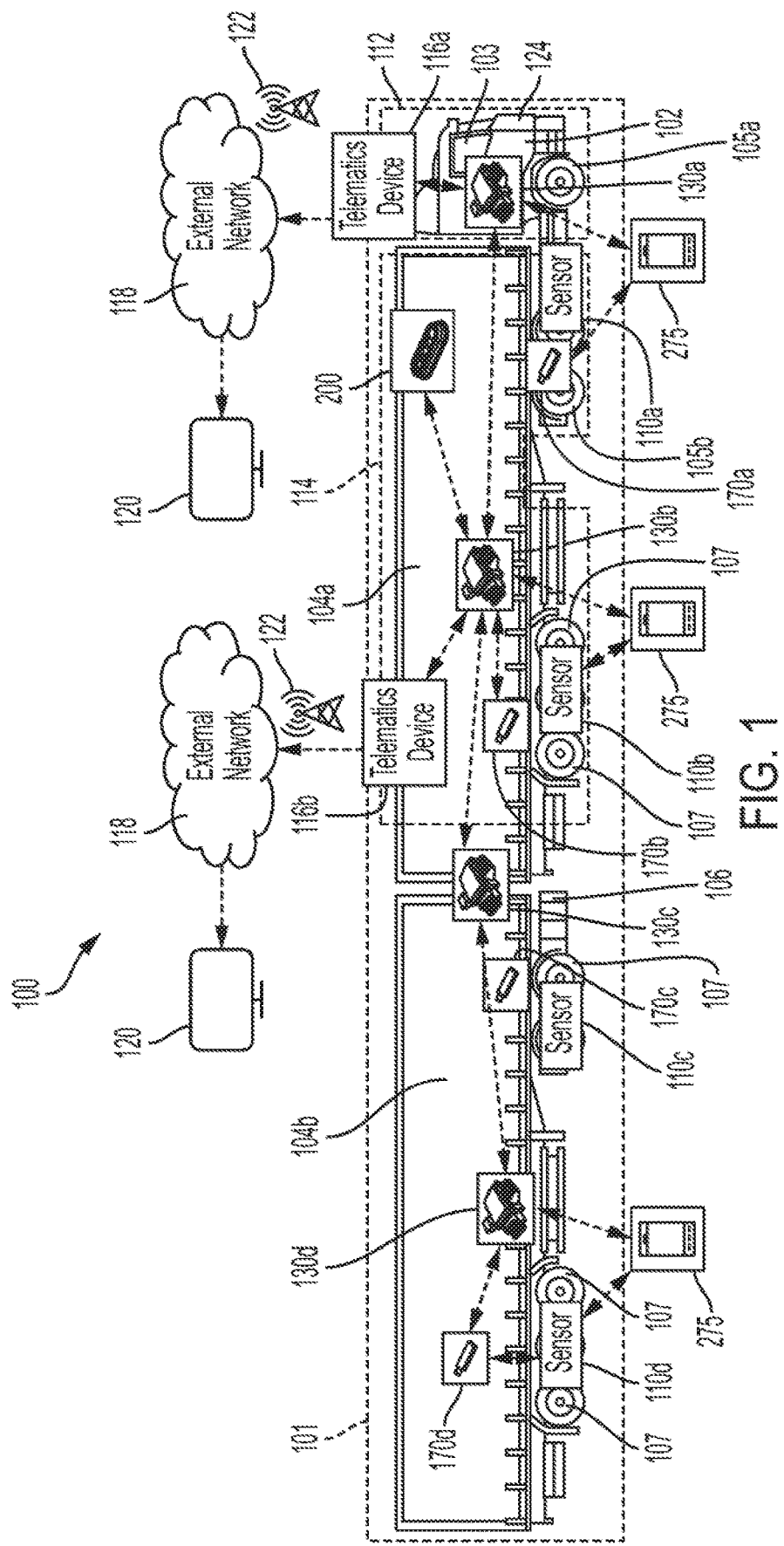
FIG. 1 is an exemplary tractor-trailer vehicle utilizing a vehicle area network in accordance with the subject technology.

As noted earlier, tractor-trailer vehicles are moving into the digital age, where customers and operators of such desire to employ numerous data collection devices, and to in turn, communicate that data from the tractor-trailer vehicles into the cloud. One major issue associated with this is the lack of an installed hardware base, yet a clear market demand for such capabilities exists. With that in mind, there is a clear need to provide easily retrofittable solutions to tractor-trailer vehicles that were originally not manufactured and fit with modern digital sensors, area networks, and telematics equipment. Further, there is also a commercial need to develop such systems that can be easily integrated into originally manufactured tractor-trailer vehicles with minimal engineering. Additionally, it is valuable to provide such systems that are easily integrate-able and connectable with various sensors, and other equipment used for data collection and manipulation, and transmission.

The subject technology addresses many of the above noted issues. The advantages, and other features of the system disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

Referring now to FIG. 1, an exemplary vehicle 100 is shown utilizing a vehicle area network (VAN) 101 in accordance with the subject technology. The vehicle 100 has a tractor 102 for pulling two trailers 104a, 104b. The tractor 102 may haul just a single trailer or multiple trailers, and as many as five. It is typically the responsibility of the truck driver to not only ensure the safe and proper operation of the vehicle 100 but to also connect and disconnect the trailers 104a, 104b. The tractor 102 also includes a cabin 103 having a dashboard (not explicitly shown) for presenting information related to the trailers 104a, 104b. The tractor 102 has front wheels 105a, which can be steered to control direction of the tractor 102. The tractor 102 also has rear wheels 105b. A dolly 106 facilitates mechanical connection of the first and second trailers 104a, 104b. The trailers 104a, 104b and dolly 106 also include wheels 107.

The trailers 104a, 104b and dolly 106 are equipped with a plurality of sensors for monitoring position, speed, temperature, pressure, weight and the like for various purposes. In FIG. 1, the components of the VAN 101 such as sensors 110a-d are shown schematically to illustrate possible locations and configurations. The driver is provided with a pairing device 275 for making wireless connections between the VAN 101 and the sensors 110. The pairing device 275 also can monitor the status of the trailers 104a, 104b as well as connect to the devices of the VAN 101. The pairing device 275 may be a tablet, smart phone, or specialized controller and the like.

The VAN 101 establishes communication between numerous components of the vehicle 100. Individual components can be connected wirelessly, wired and combinations thereof. The connections may utilize various communication protocols, as will be discussed in more detail herein. The VAN 101 can utilize WiFi to establish a high bandwidth backbone, in effect a first level of the VAN 101. The VAN 101 may include any number of sub-networks, in effect second levels of the VAN 101. For example as shown in FIG. 1, the VAN 101 includes a tractor subnetwork 112 and a trailer subnetwork 114. Each subnetwork 112, 114 includes one or more wireless hubs 130a-d. The first trailer 104a includes the wireless hub 130b, the dolly 106 includes the wireless hub 130c and the second trailer 104b includes wireless hub 130d. As the tractor 102, trailers 104a, 104 and dolly 106 are often reconfigured with other trailers and dollies, quick and easy pairing to establish the subsequent vehicle area network is beneficial.

The VAN 101 also includes a first telematics module 116a on the tractor 102 and in communication the tractor hub 130a as well as a second telematics module 116b on the first trailer 104 and in communication with the first trailer hub 130b. The telematics modules 116a, 116b also communicate with external networks 118 having external devices 120. The telematics modules 116a, 116b communicate with the external networks 118 via cell towers 122. Preferably, the tractor 102 has a chassis CAN bus 124 over which the tractor hub 130a and the telematics module 116a communicate. The trailers 104a, 104b may be substantially identical or quite differently configured not just in terms of hardware but software. However, the VAN 101 can automatically integrate components so that the driver is needed for little pairing activity with the smart device 275 if any at all. Telematics modules and services are available commercially from numerous suppliers, such as CALAMP modules of Irvine, Calif.

The wireless hubs 130a-d are powered by a wired power line communication (PLC) cable, typically connected by the driver when mechanically coupling the trailer 104a, 104b to the tractor 102. The wireless hubs 130a-d communicate using WiFi with a 802.15.4 thread network protocol and/or over the CAN bus 124. The wireless hubs 130a-d can also communicate by common lower power friendly means such as BLUETOOTH communication technology or 433 Mhz technology. The wireless hubs 130a-d can also use near-field communication as well as with any other wireless communication protocol now known or later developed.

The hubs 130a-d can be connected to one or more components or each other using a wired connection. For example, the tractor hub 130a can be connected to the front trailer hub 130b with a wired cable connection. The wired cable connection can optionally provide power from the tractor hub 130a to the trailer hub 130b while simultaneously allowing communication through PLC techniques. The wired connection can allow the tractor hub 130a and the first trailer hub 130b to automatically pair upon making the physical connection. During pairing, the hubs 130a, 130b communicatively connect utilizing the PLC connection to share credentials of the VAN 101 in accordance with out of band pairing techniques. Similarly, the hubs 130c, 130d can also be hard wired and automatically integrated into the VAN 101.

Each wireless hub 130a-d acts as central communication or access point for devices within the respective local area or subnetwork 112, 114 of the vehicle 100. To that end, the tractor wireless hub 130a creates the tractor subnetwork 112 for all devices in and around the tractor 102 of the vehicle 100. Similarly, the first trailer hub 130b creates the trailer subnetwork 114 for all devices in and around the first trailer 104a. Further, a wireless hub 130c on the dolly 106 is part of the first trailer subnetwork 114 but could even form another subnetwork. Other subnetworks may also be included, for example, for other additional trailers, dollies, and/or areas of the truck.

Still referring to FIG. 1, the tractor wireless hub 130a establishes communication to the tractor telematics module 116a, the pairing device 275 and the first trailer wireless hub 130b to establish the tractor subnetwork 112. The tractor hub 130a can communicate with the first trailer hub 130b by PLC and/or WiFi, with the pairing device 275 by WiFi, and over the CAN bus 124 with the telematics module 116a. In one embodiment, the tractor hub 130a uses Thread networking communication technology based on the IEEE 802.15.4 radio standard for low power consumption and latency. The communication protocol may include AES 128 encryption with a media access control (MAC) layer network key.

The tractor 102 also includes a plurality of sensors 110a. For simplicity in FIG. 1, only one sensor 110a is shown schematically, but represents any kind of sensor in any location. In order to facilitate communication between the tractor hub 130a and the sensor 110a, the tractor subnetwork 112 can include a range extender transmitter/receiver 170a paired with the sensor 110a. Depending upon the sensor configuration, the sensor 110a may also communicate directly with the tractor hub 130a. The transmitter/receiver 170a and sensor 110a may utilize Thread networking communication technology among others.

For example, communication between the transmitter/receiver 170a and sensor 110a may be via BLUETOOTH communication technology. The transmitter/receiver 170a acts as a range extender for the sensor 110a. However, BLUETOOTH communication technology is susceptible to eavesdropping so that out of band (OOB) pairing is needed. The pairing device 275 is used to accomplish the OOB pairing. The pairing device 275 can use near-field communication (NFC) with the hubs 130a-d, sensors 110a-d and transmitter/receivers 170a-d.

Pairing the components 110a-d, 130a-d, 170a-d can use multiple technologies and techniques in any combination. The example given here is based on the normal commissioning/pairing process for a Thread device. The pairing device 275 can use WiFi or even read a barcode to link to the hub 130a. Once linked to the hub 130a, the pairing device 275 can use RFID technology such as an NFC tag to establish the OOB (Out of Band) pairing connection to the transmitter/receiver 170a and sensor 110a. NFC technology is desirable because the pairing device 275 could simply be a smart phone running an application and held in proximity to the transmitter/receiver 170a or sensor 110a. The OOB pairing link can use datagram transport layer security (DTLS), which is a communications protocol that provides security by allowing communication in a way that is designed to prevent eavesdropping, tampering, and message forgery. Additionally, access can be protected by using a pre-shared key (PSK) generated by an algorithm such a J-PAKE.

Once the pairing device 275 establishes communication between the hub 130a, sensor 110a and transmitter/receiver 170a, the tractor subnetwork 112 is established. In a similar manner, the trailer subnetwork 114 can be established. The first trailer hub 130b establishes the first trailer subnet 114 that also includes a plurality of sensors 110b. Again for simplicity, only a single sensor 110b is shown schematically representing, for example, a TPMS. A transmitter/receiver 170b is paired with the sensor 110b. The first trailer 104a also includes a telematics module 116b and beacon 200, both of which are part of the first trailer subnetwork 114. The telematics module 116b communicates with external networks 118 via a cell tower 122 as well. The beacon 200 may also communicate directly, whether wired or wirelessly, with the tractor hub 130a.

The tractor hub 130a is also paired to the trailer hub 130b so that the respective subnetworks 112, 114 are in secure communication. To pair the hubs 130a, 130b, the OOB pairing link can use a physical connection with ISO 11992, which is a CAN based vehicle bus standard in the heavy-duty truck industry for communication between the tractor and one or more trailers. The pairing of the hubs 130a, 130b can share a unique data key such as a key generated by AES-128 encryption.

The beacon 200 provides a separate means of transmitting information wirelessly. In particular, the beacon 200 can be configured to act as a GPS, transmitting location data for the first trailer, allowing a remote user to locate the trailer. The beacon 200 is particularly useful for tractor drivers who are picking up a trailer from a large lot of many trailers. For example, certain lots tend to store an enormous number of trailers and are not well organized or marked, requiring drivers to search to locate a particular trailer. Typically, the driver is tasked with seeking out the trailer through a particular identifier on the trailer, such as a license plate. This inefficiently requires the driver to look individually at the license plate of each trailer on the lot to determine whether it is the correct trailer. Further, license plates can be difficult to read accurately from a distance, requiring the driver to approach each license plate within a reasonable distance or even get out of the tractor. As such, the beacon 200 improves the manual searching process by providing a GPS signal to the external networks 118 which ultimately is received by telematics module 116a in the tractor 102. Thus, the beacon GPS signal can be used by the driver to quickly and easily locate the trailer 104a within the lot. It is envisioned that the dashboard of the tractor 102 may display not only the location of the beacon 200 but assist with directions on how to drive to the beacon 200. The beacon 200 can also include a clear visual identifier, such as a blinking light of a specified color or a display showing an identifier, to alert the driver when the driver is close to the correct trailer 104a. The beacon 200 eliminates the need for the driver to carefully search the entire lot and allows the driver to quickly and easily identify and connect to the proper trailer.

Still referring to FIG. 1, the dolly 106 and second trailer 104b also include respective hubs 130c, 130d that become part of the VAN 101. The hubs 130c, 130d similarly communicate with a plurality of sensors 110c, 110d and any transmitter/receiver 170c, 170d paired with the sensors 110c, 110d. Depending upon the configuration, the hubs 130c, 130d may form subnetworks or simply communicate with the first trailer hub 130b, which relays the information to the tractor hub 130a. The second trailer 104b can include a telematics module, beacon and other hardware as needed.

Generally, a transmitter/receiver 170a-d is positioned proximate a respective sensor, which may be pressure, temperature, speed, position, or other sensors. The transmitter/receiver 170a-d receives measured data from one or more sensors and reports that data to the local hub wirelessly. The transmitter/receiver 170a-d may also use the 433 MHz frequency band for communication. In other cases, the sensors 110a-d are wired directly to the local hub 130a-d, or are connected wirelessly directly to the local hub 130a-d.

It is envisioned that the subnetworks 112, 114 can be established in advance. In other words, for the trailer subnetwork, pairing the sensor 110b, transmitter/receiver 170b and hub 130b can be accomplished during assembly by a technician using a pairing device 275. As noted above, the pairing may be very automatic, and to the extent needed, performed by the driver upon connection of the trailer 104a. Many sensors and such devices can be difficult to physically access so that pairing upon installation is advantageous. A sensor, for example, might be located on an axle of the vehicle or within a vehicle braking system. The driver or technician's pairing device 275 may be able to read a code from the sensor, such as a QR code or NFC tag. The technician's pairing device 275 will be trusted by the VAN 101 (e.g. having passcode credentials for the network, or the like) and/or can be manually connected to the VAN 101, whether wired or wirelessly. The pairing device 275 can then pair the sensor 110b to the hub 130b using the code from the sensor 110b, thereby connecting the sensor 110b to the subnetwork 114 and, ultimately, to the VAN 101.

Once the transmitter/receivers 170a-d are paired for wireless communication to corresponding wireless hubs 130a-d, information can then be transmitted from multiple devices across the VAN 101. The data can be processed and provided to a central location of the vehicle 100, such as within the tractor 102 where the driver can see alerts, or other feedback related to the readings of the sensors 110a-d.

In some cases, one or more of the tractor 102 and trailers 104a, 104b can include a 3rd party, on-board telematics device 116a, 116b. In the example shown, the tractor hub 130a is in communication with a first telematics device 116a and the first trailer hub 130b is in communication with a second telematics device 116b in the first trailer 104a. Each telematics device 116a, 116b transmits data to a third party source. In the example given, the data is transmitted to an external cloud platform where the data can then be obtained by external devices 120, such as computers, smartphones or the like (e.g., the pairing device 275). The data can then be relied upon for fleet and asset management functions, such as checking health of various components of the truck. In other cases, the telematics devices 116a, 116b can transmit to mediums other than a cloud network, such as a wide area network or directly to third party devices.

Once information from the VAN 101 is transmitted out of the vehicle 100 to the external networks 118 and devices 120, additional data review, analysis and insight can be ascertained. The analysis and insight can then be sent back to the trailer 102 for review by the driver. A suite of warning strategy functionality can be general or specific to particular needs. The algorithm that develops the warnings is optimized by ongoing data analysis. For example, the vehicle behavior is characterized so that particularly identified parameters can be measured. Some parameters are tire pressure with reference temperature, spare tire pressure, system temperature, system pressure, and gross vehicle weight (GVW). The external device 120 may have specific data such as a range or maximum allowable limit. Since the maintenance of these parameters is ongoing, if the GVW is over limit or out of range, or a tire is under low pressure or unsafe to drive on, a warning message can be sent to the driver for investigation and corrective action. For another example, a fast pressure loss in a tire would generate an alert to the driver.

The subnetworks 112, 114 for the vehicle 100 are part of and in local communication within the broader VAN 101, with one wireless gateway hub acting as an access point for the VAN 101. In some cases, the access point for the VAN 101 can change to a different gateway depending on the number of trailers 104 attached to the tractor 102 such that the access point is in a central location of the vehicle 100. To centralize the access point, the tractor hub 130a searches down the length of the vehicle 100 for additional hubs 130 to determine a centrally located hub 130. Since the hubs 130 will be somewhere along the length of the vehicle 100, the VAN 101 can determine hub locations through a linear search, rather than by searching a broad surrounding radius.

If, for example, only a single trailer 104a is provided, the access point can be the wireless hub 130 in the center of the one trailer, which all devices (e.g., transmitter/receivers, sensors and the like) in the trailer 104a or tractor 102 can wirelessly reach. If the second trailer 104b is included, the access point could still be located within the first trailer 104a at a location central to the vehicle 100 or, alternatively at the dolly hub 130c which is also centrally located. If additional trailers are added (e.g. a third and fourth trailer), the access point can be changed to a new hub at a central location of the vehicle 100, or can use multiple interconnect access points to leap frog wireless signals through the entire length of the vehicle 100. Alternatively, a full WiFi mesh system could be used to connect many hubs at locations across the vehicle 100. Having wireless hubs 130a-d which control the central communication at each area of vehicle 100 allows many devices to quickly and easily communicate over the VAN 101, even when devices within the VAN 101 may be changed (e.g., sensor repair), or new or additional trailers and dollies may be added to the vehicle 100. In each case, each new device need only be paired and connected to one wireless hub, and data from all devices can be shared across the VAN 101. From the above, it should be understood that the exact number and arrangement of the components shown in FIG. 1 are exemplary only, and should not be construed as limiting.

Autonomous Vehicles

As vehicles become self-driving, the subject technology will seamlessly integrate with the suite of autonomous technology. For example, the data analysis from monitoring the sensors can be used to control speed or even redirect the autonomous vehicle to a service station or rest stop to attend to repairs. The data analysis may also require the autonomous vehicle to enter an emergency mode where the vehicle may be pulled over for towing or control ceded to a remote operator.

In one embodiment, the tractor and the trailer are merged as one. As would be expected, the integration of sensors on the trailer portion into the vehicle area network on the merged tractor-trailer is only required initially. The merged tractor-trailer can still connect and carry additional trailers.

Wireless Hubs

As used herein, a micro controller, computer or smart device is one or more digital data processing devices. Such a device generally can be a personal computer, computer workstation, laptop computer, a tablet computer, server computer, mainframe computer, handheld device (e.g., personal digital assistant, Pocket PC, cellular telephone, etc.), information appliance, printed circuit board with components or any other type of generic or special-purpose, processor-controlled device, with or without application specific integrated circuits (ASICs), capable of receiving, processing, displaying, and/or transmitting digital data. A controller includes random access memory (RAM), mechanisms and structures for performing input/output operations, a storage medium such as a magnetic hard disk drive(s), and an operating system (e.g., software) for execution on a central processing unit (CPU). The controller also has input and output devices such as a display screen, a keyboard and mouse and the like.

A CPU generally is logic circuitry that responds to and processes instructions that drive a controller and can include, without limitation, a central processing unit, an arithmetic logic unit, an application specific integrated circuit, a task engine, and/or any combinations, arrangements, or multiples thereof. Software or code generally refers to computer instructions which, when executed on one or more digital data processing devices, cause interactions with operating parameters, sequence data/parameters, database entries, network connection parameters/data, variables, constants, software libraries, and/or any other elements needed for the proper execution of the instructions, within an execution environment in memory of the digital data processing device(s).

A module is a functional aspect, which may include software and/or hardware. Typically, a module encompasses the necessary components to accomplish a task. It is envisioned that the same hardware could implement a plurality of modules and portions of such hardware being available as needed to accomplish the task. Those of ordinary skill will recognize that the software and various processes discussed herein are merely exemplary of the functionality performed by the disclosed technology and thus such processes and/or their equivalents may be implemented in commercial embodiments in various combinations without materially affecting the operation of the disclosed technology.

Figure 2A:
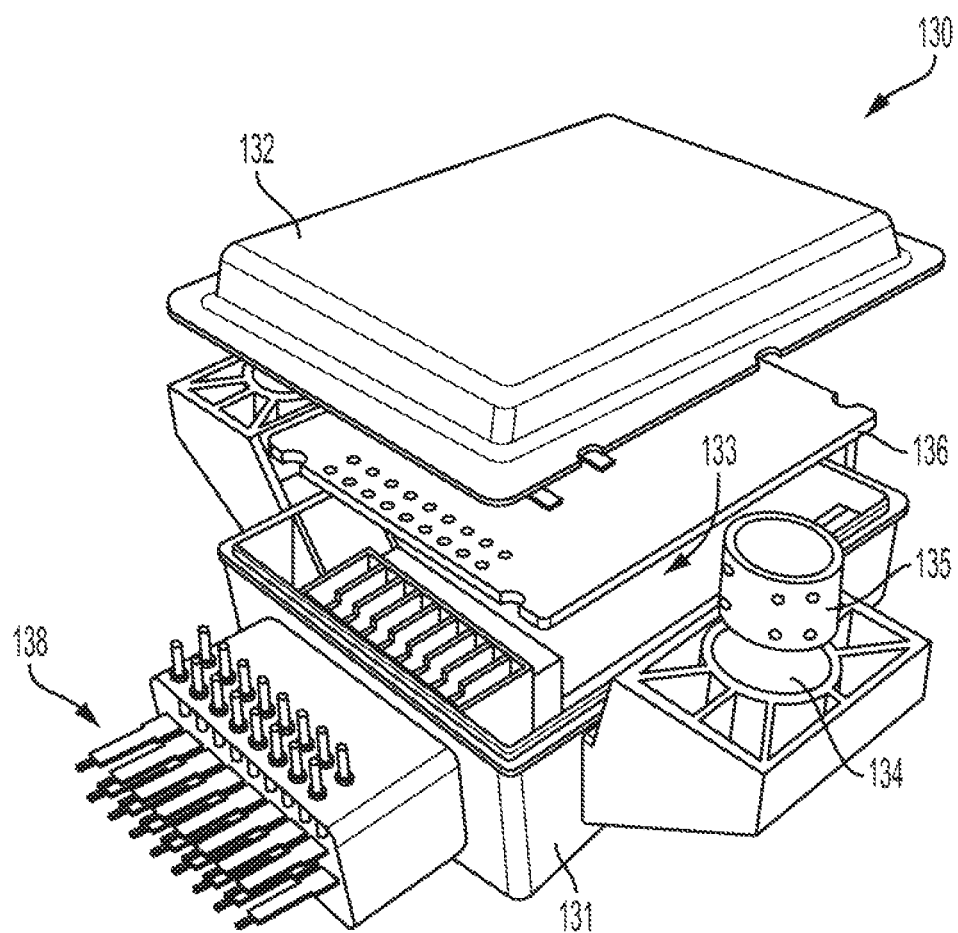
FIG. 2A is an exploded view of a wireless hub in accordance with the subject technology.

Referring now to FIG. 2A, an exploded view of a wireless hub 130 is shown. Each hub 130a-d may be differently configured, but in FIG. 2A an exemplary hub 130 is shown. The wireless hub 130 includes an enclosure 131 with a removable lid 132 that connects to form a protected interior 133. The enclosure 131 forms opposing recesses 134 for compression limiters 135 to maintain the joint integrity of the plastic enclosure 131. The hub 130 includes a printed circuit board (PCB) 136 having electronics, such as a processor and memory (not explicitly shown) required to create modules to carry out the functions of the wireless hub 130, including data processing, storage, and transmission.

The wireless hub 130 has an antenna (not shown explicitly) connected to the PCB 136 for wireless transmission. Additional antennas may be included as needed to allow the hub 130 to transmit and receive data with other devices as described herein. For wired connections, the hub 130 includes connecting pins 138. The hub 130 may be powered by a battery and/or from a wired connection. In one embodiment, the hub 130 is connected to a +12/24V supply 144 (see FIG. 2B). The wireless hub 130 is configured to withstand large temperature changes in the range of −40° C. to +85° C. The hub 130 mounts external to the tractor cabin such as on the chassis rail.

Figure 2B:
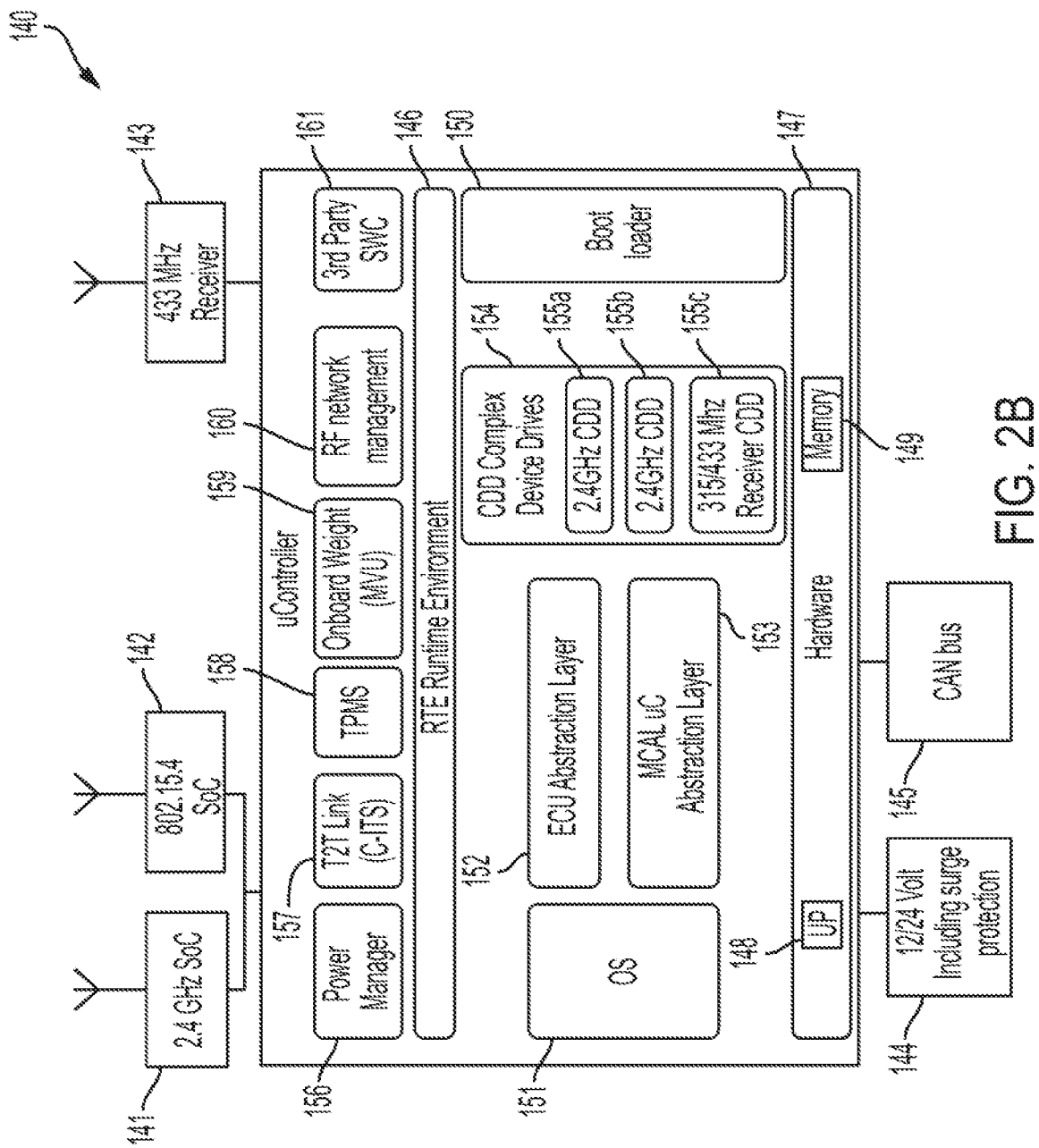
FIG. 2B is a block diagram schematic view of a wireless hub in accordance with the subject technology.

Referring now to FIG. 2B, a schematic diagram of a micro controller 140 suitable for use as a portion of the wireless hub 130 is shown. Typically, the micro controller 140 is part of the PCB 136 of FIG. 2A. The PCB 136 includes additional separate peripheral modules 141, 142, 143, 144, 145 and such may be incorporated into the micro controller 140. The micro controller 140 and modules 141, 142, 143, 144, 145 may include one or more standardly available components or be fabricated as one or more ASICs.

The hubs 130a-d can transmit and/or receive data between other hubs and/or range extenders 170a-d using a WiFi module 141 with a 2.4 GHz frequency band. The WiFi module 141 creates tractor-to-trailer transparent IP-based data communication. A second 802.15.4 thread network protocol communication module 142 can send and receive additional sensor content and range extension. A third communication module 143 can use sub-GHz (e.g., a 433 MHz frequency band) with on-board decode and polling functionality for low power modes. The third communication module 143 is particularly well-suited for data from nearby sensors that are battery powered and, thus, low power.

The micro controller 140 can also be connected for communication to a CAN bus 145, which is typically located in the tractor 102. The micro controller 140 can also be directly connected to another wireless hub 130 so that the hub 130 can act as a radio frequency (RF) to CAN gateway. The PCB 136 also includes a 12/24 V power supply 144 with surge protection to power and protect the micro controller 140 and other components from electrical damage.

When the micro controller 140 is operating, hardware 147 creates a runtime environment (RTE) 146 so that the stored programs are running (e.g., instructions are being executed). The hardware 147 includes a processor 148 coupled to memory 149 along with other components not explicitly shown. Programs are stored in the memory 149 and accessed by the processor 148. A boot loader module 150 allows programming to the memory 148. An operating system module 151 allows the user to interface with the hardware 147. An ECU abstraction layer module 152 facilitates uniform access to the micro controller functions performed by peripherals and application program interfaces (APIs). A MCAL micro controller abstraction layer module 153 facilitates direct access to the devices on the PCB 136. A complex device drive module 154 includes various sub-modules 155a-c to implement drivers for the communication devices 141, 142, 143 as needed. The boot-loader module 150 can run the micro controller 140 for programming and writing information to the memory 149.

As can be seen, the micro controller 140 is specifically designed for use in the VAN 101. The micro controller 140 also includes a power manager module 156 and a Truck to Trailer network link software module 157. The micro controller 140 includes a TPMS module 158 and onboard weight motor vehicle unit module 159 to accomplish TPMS and MVU weight measurements in the VAN 101. The micro controller 140 also includes a RF network management module 160 and a third party software component module 161 to facilitate use of RF network components and third party software. Other modules may be present in the micro controller 140 to accomplish any desired features in the VAN 101. Further, the micro controller 140 features may be expanded by having hardware and software ready to host additional software and support other components (e.g., additional sensors, hubs, subnetworks).

Transmitters/Receivers

Figure 3A:
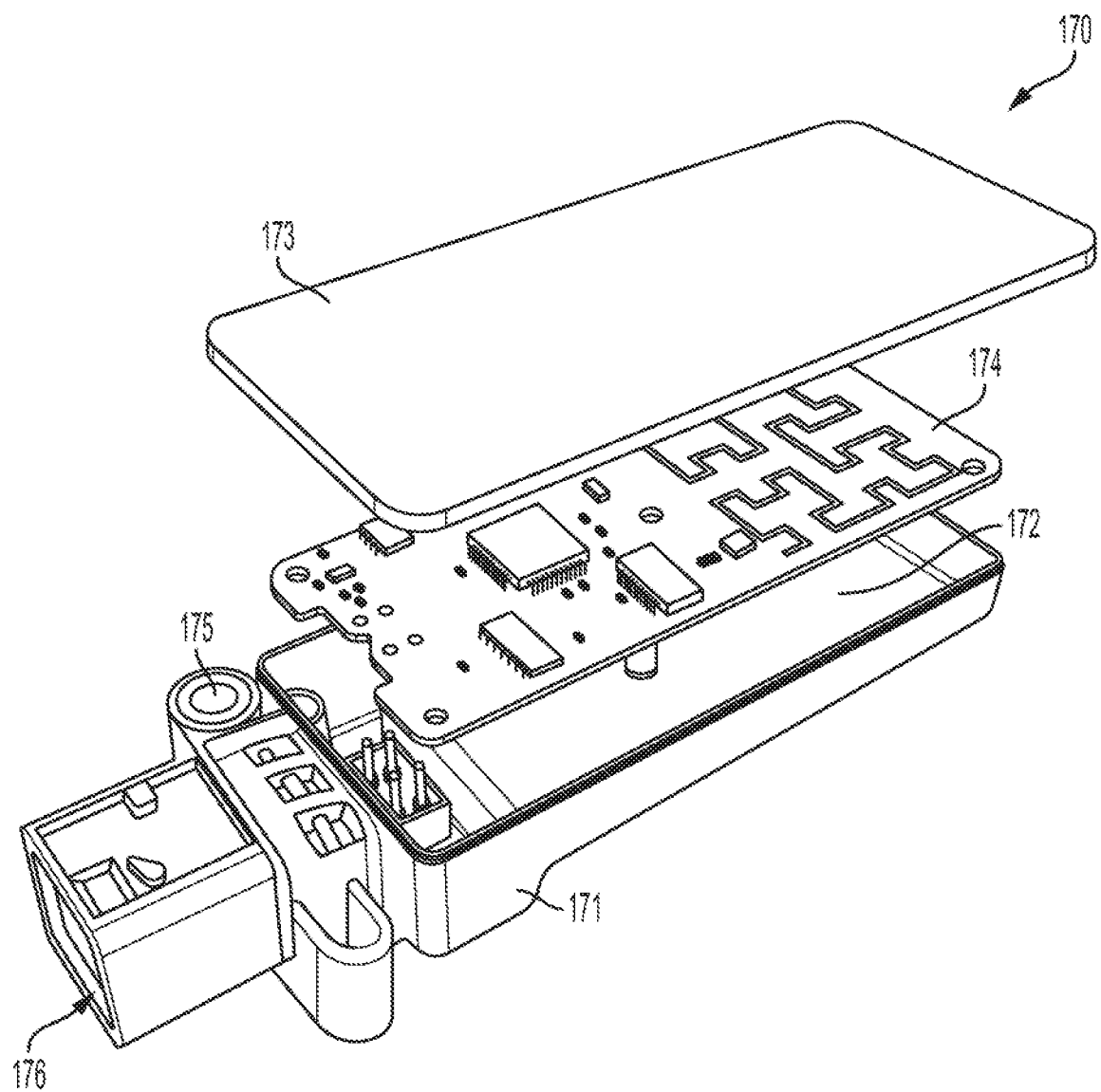
FIG. 3A is an exploded view of a range extender in accordance with the subject technology.
Figure 3B:
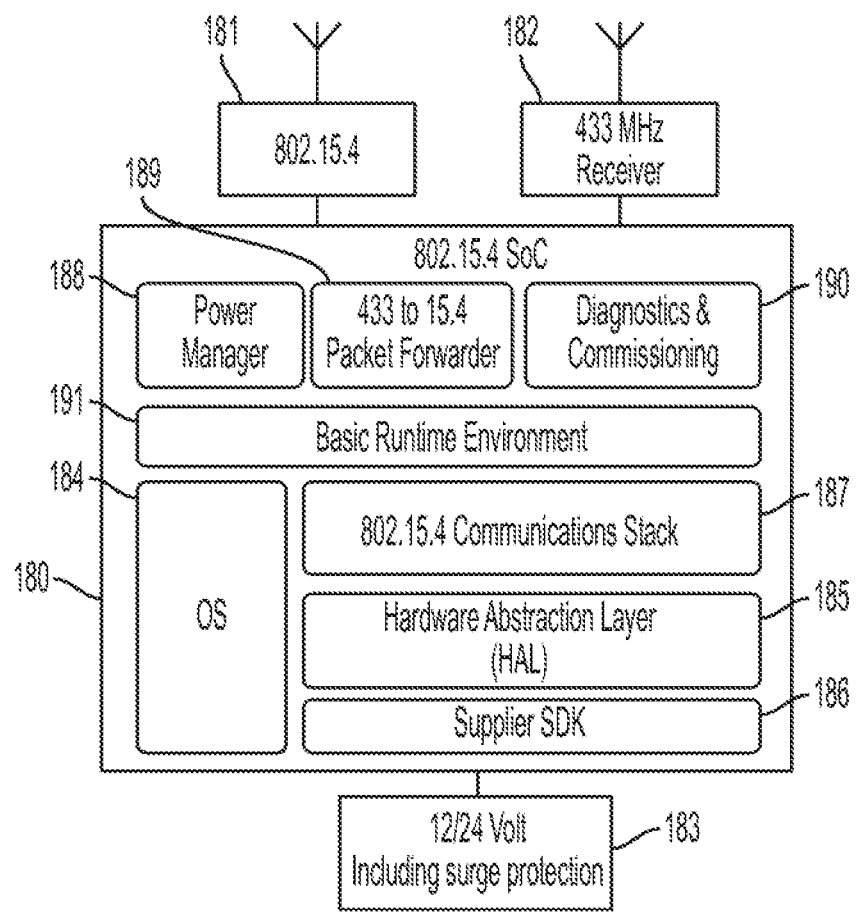
FIG. 3B is a block diagram schematic view of a range extender in accordance with the subject technology.

Referring now to FIGS. 3A and 3B, an exploded view and a schematic view of an exemplary transceiver/receiver 170 are shown, respectively. The transmitter/receiver 170 includes an enclosure 171 forming a cavity 172 that is sealed with a lid 173 for protection of a printed circuit board (PCB) 174. Again, one or more compression limiters 175 fit in the enclosure 171 to maintain the joint integrity of the plastic enclosure 171. The PCB 174 includes the electronics to carry out all the functions of the transmitter/receiver 170 including sending/receiving data, data processing, and storage. The PCB 174 may include a processor, memory, an antenna and other components (not explicitly shown).

For wired connections, the transmitter/receiver 170 includes a connector 176. The transmitter/receiver 170 may be powered by a battery and/or from a wired connection. In one embodiment, the hub 130 is connected to a +12/24V supply 183. The transmitter/receiver 170 is also configured to withstand large temperature changes in the range of −40° C. to +85° C. Preferably, the transmitter/receiver 170 can mount in any suitable location but outside the chassis rail is preferred.

Typically, most, if not all functional modules, are created by components of the PCB 174 but one or more peripheral components 181, 182, 184 could also be utilized. The PCB 174 may include one or more standardly available components or be fabricated as one or more application specific integrated circuits (ASICs). The components of the PCB 174 work together to form a central processing unit 180.

The transmitter/receiver 170 can transmit and/or receive data to hubs and/or other transmitter/receiver 170 using a 802.15.4 thread network protocol communication module 181 as well as send and receive additional sensor content. Thus, the transmitter/receiver 170 can be used to enlarge the size of the VAN 101. A sensor communication module 182 uses sub-GHz (e.g., a 433 MHz frequency band) for low power modes to efficiently work with nearby sensors that are battery powered.

When the transmitter/receiver 170 is operating, a runtime environment (RTE) 191 is created so that the stored programs are running (e.g., instructions are being executed). The PCB 174 may include a processor coupled to memory along with other components not explicitly shown. The programs are stored in the memory and accessed by the processor. One program is an operating system module 184 that allows the user to interface with the hardware 147, typically using the pairing device 275.

A hardware abstraction layer module 185 facilitates uniform access to the range extender functions. A supplier software development kit (SDK) module 186 facilitates creation of applications with advanced features specific to the transmitter/receiver 170 and operating system module 184. The PCB 174 includes a communications stack module 187 to support the 802.15.4 thread network protocol communication module 182.

As can be seen, the transmitter/receiver 170 is specifically designed for use in the VAN 101. The transmitter/receiver 170 includes a power manager module 188 and a packet forwarder module 189 for assisting with data conversion. The transmitter/receiver 170 also includes a diagnostic and commissioning module 190 that provides a user interface via the smart device 275 for start-up and troubleshooting purposes. Other modules may be present in the transmitter/receiver 170 to accomplish any desired features in the VAN 101. Further, the transmitter/receiver 170 features may be expanded by having hardware and software ready to host additional software and support other components.

The transmitter/receiver 170 is particularly beneficial when retrofitting technology on to an existing trailer or tractor for future incorporation into a vehicle area network. The transmitter/receiver 170 may connect to various sensors, wired or wirelessly, then pass along the data to a wireless hub. In effect, the transmitter/receiver 170 is the additional hardware to bridge communications with existing hardware to the new networked components.

Tire Pressure Monitor System

Further, the sensors may also be retrofit. For example, see U.S. patent application Ser. No. 16/119,109 filed on Aug. 31, 2018 entitled TIRE PRESSURE MONITOR WITH VARIABLE ANGLE MOUNTING, which is incorporated herein by reference. In addition to sensors indicating the tire pressure, the sensors may auto-locate or be programmed to indicate wheel position. As such, when the VAN 101 identifies a pressure reading, the pressure reading is associated with a specific tire. The tire-related data can include temperature data as well, which is also an indication of proper and improper performance.

It is envisioned that the smart device 275 can be used to assist in refilling tire pressure alleviating the need for a tire pressure gauge by having the pressure reading on the smart device 275 or other indicia, such as beeping the horn/flashing the lights, to indicate that the pressure is within specification. If the tire is equipped with automatic tire fill, the VAN 101 can trigger refill and stop at the desired pressure. The sensors can also provide an indication that the lift axle is lowered but the tire is not turning. In this instance, a tire lock warning could be generated and/or acted upon such as in an autonomous vehicle. Similarly, a tire blow out can be detected quickly after the burst event to send a warning indicating the blow out and location. In the self-driving vehicle, the tire burst warning generates a reaction for safety and control. Preferably, the sensors are battery powered with efficient power usage for long life.

Beacons

Figure 4A:
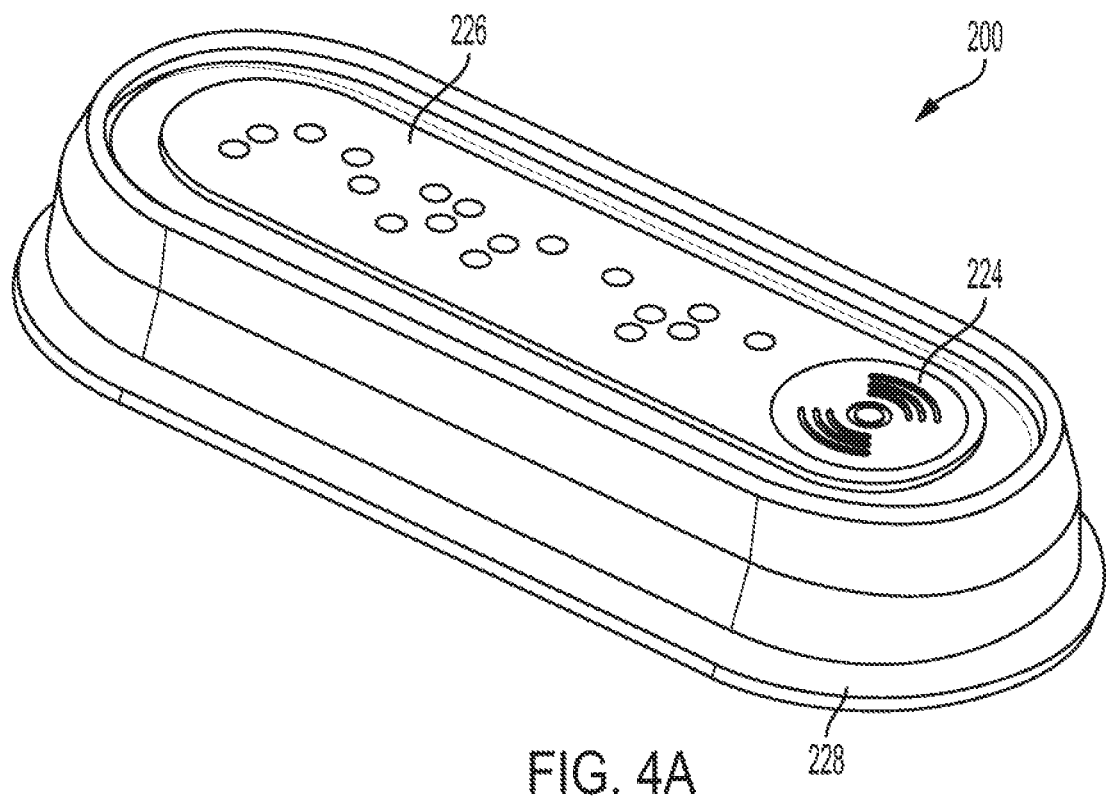
FIG. 4A is a perspective view of a beacon in accordance with the subject technology.
Figure 4B:
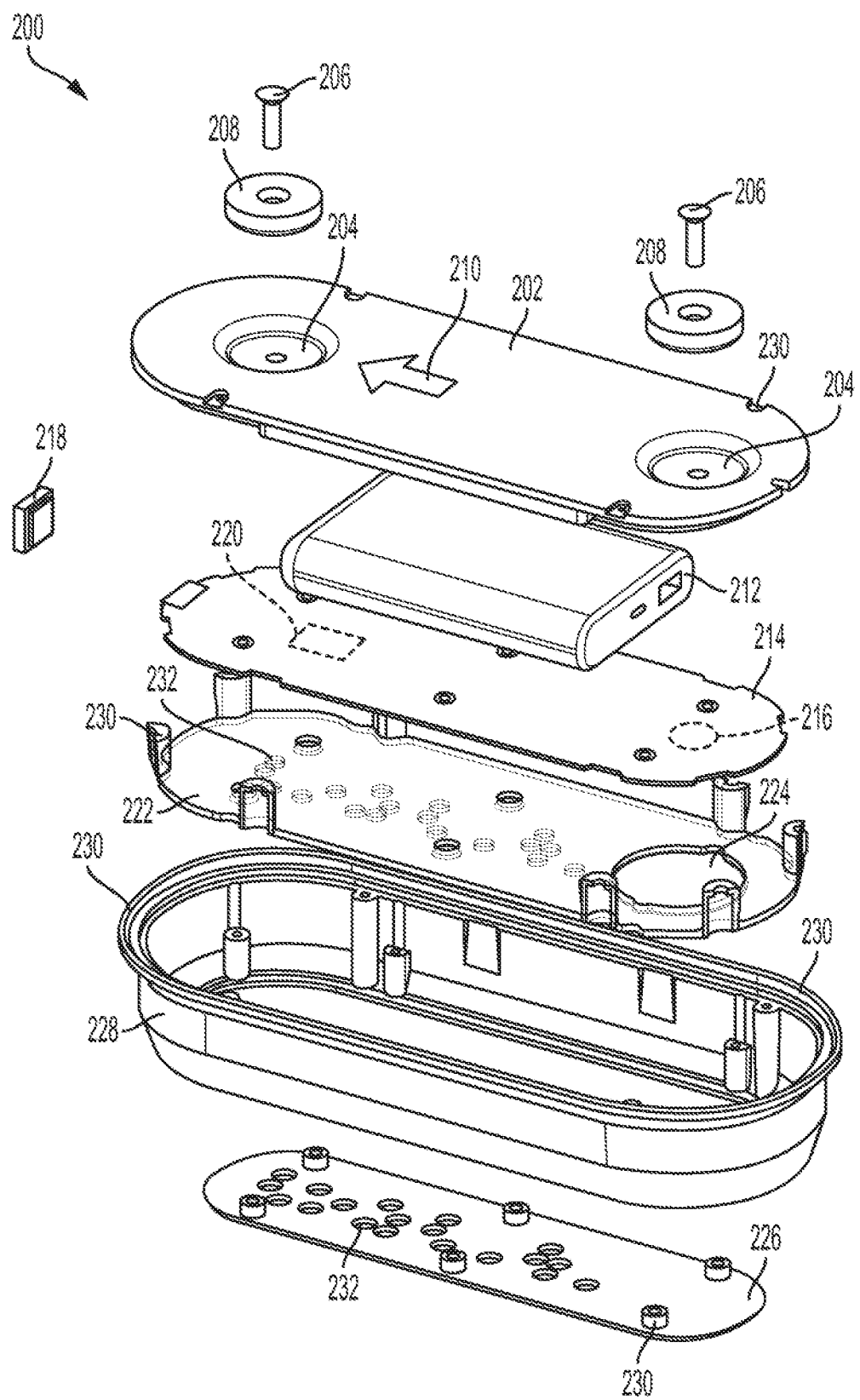
FIG. 4B an exploded view of a beacon in accordance with the subject technology.

Referring now to FIGS. 4A and 4B, a perspective and a bottom exploded view of a beacon 200 in accordance with the subject technology is shown. The beacon 200 may mount to the trailer 104a magnetically, with a bracket or by any other fastener. A bottom plate 202 forms two recesses 204. Screws 206 hold magnets 208 in the recesses 204 so that the beacon 200 can simply be placed against the trailer 104a for mounting and easily removed without tools for wireless charging, relocation, repair and the like. The bottom plate 202 has an indicia arrow 210.

The beacon 200 also includes a rechargeable battery 212 for a power source. A printed circuit board (PCB) 214 has an LED 216 (shown in dashed lines) that illuminates to show such information as the status of the trailer 104a (e.g., connected to the VAN 101 (e.g., solid light) or in process of being connected (e.g., flashing light)). The PCB 214 also has components to wirelessly communicate with the hubs 130a-d and or transmitter/receivers 170a-d. The PCB 214 is also equipped to interface with a smart device 218 that can use near-field communication (NCF). The PCB 214 also has a GPS module 220 (shown in dashed lines) so that the VAN 101 can locate the beacon 200, and in turn the trailer 104a at a great distance as described above. The beacon 200 also has a PCB top plate 222 for protecting the PCB 214. The PCB top plate 222 has a translucent window 224 aligned with the LED 216. A top cover 226 couples to the bottom plate 202 to seal the battery 212, PCB 214 and PCB top plate 222 within an oval housing 228. Preferably, the top cover 226, bottom plate 202, PCB 214, PCB top plate 222 and oval housing 228 have features 230 for screwing together. The PCB top plate 222 and top cover 226 also have a plurality of aligned holes 232.

Multi-Trailer Ordering

Figure 5:
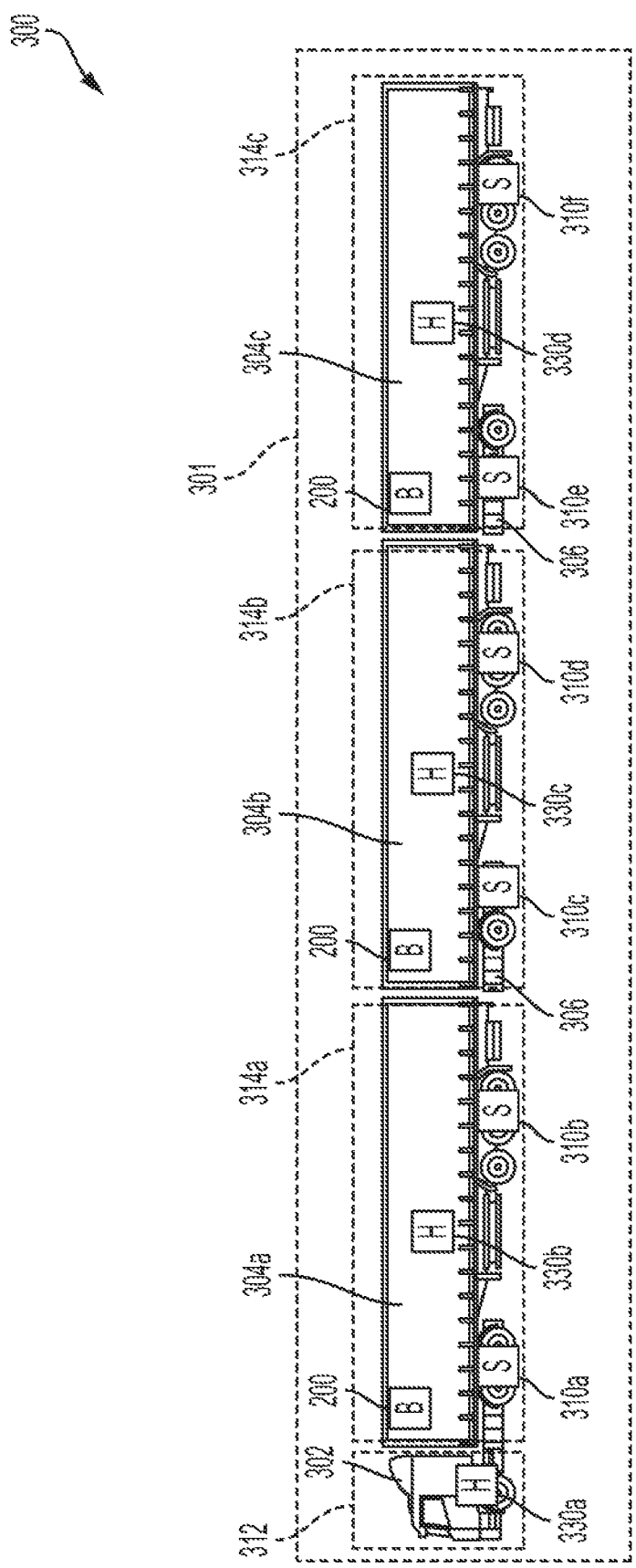
FIG. 5 is another exemplary tractor-trailer vehicle utilizing a vehicle area network in accordance with the subject technology.

Referring now to FIG. 5, another exemplary vehicle area network (VAN) 301 for a tractor-trailer vehicle 300 is shown. The components and functionality of the VAN 301 and tractor-trailer vehicle 300 can be similar to the vehicle 100 and VAN 101 described above, except as otherwise indicated herein. Thus, like reference numerals in the "3" series represent similar components. For clarity, several components are not shown.

The vehicle 300 includes a tractor 302 with three trailers 304a-c and two dollies 306, all including components similar to those discussed with respect to FIG. 1. The VAN 301 allows for communication between all of the components of the vehicle 300, such as wireless hubs 330a-d, sensors 310a-f (e.g., TPMS, pressure sensors, temperature sensors and the like), beacons 200, and the like, as discussed above. The tractor 302 and each trailer 304a-c have a corresponding subnetwork 314a-c within the VAN 301 which connects the components proximate the respective trailer 304a-c. Although not shown, it is envisioned that the VAN 301 includes transmitter/receivers and other components as desirable for robust performance. Each trailer 304a-c also includes a beacon 200 for assisting the driver in assembling the vehicle 300.

It is advantageous for the VAN 301 to be informed of the relative location of the trailers 304a-c and/or subnets 314a-c established on the vehicle 300. The VAN 301 having the relative location helps to identify where various sensors, and other components such as the tires, are located. In some cases, it can be a challenge for the VAN 301 to identify the exact ordering of the trailers 304*a-c*. Further, even if this is manually calibrated, trailers are often dropped off, and new trailers picked up and attached to the truck, requiring the new trailers to be ordered within the VAN 301. Therefore, it is advantageous for the VAN 301 to be capable of connecting to and establishing communication with trailers automatically and determining an order of the trailers.

Referring now to FIGS. 6A-6D, a flowchart 600 of a method for automatically recognizing the order of three trailers 304*a-c* on the vehicle 300 is shown. The method relies on data, including signal strength and time of flight (ToF) to continuously monitor and update the status of the vehicle 300. The flowchart herein illustrates the structure or the logic of the present technology, possibly as embodied in computer program software for execution on by the hardware described herein. Those skilled in the art will appreciate that the flowchart illustrates the structures of the computer program code elements, including logic circuits on printed circuit boards having integrated circuits that function according to the present technology. As such, the present technology may be practiced by a machine component that renders the program code elements in a form that instructs a digital processing apparatus (e.g., micro controller or computer) to perform a sequence of function step(s) corresponding to those shown in the flowchart.

At step 602, the method starts with the micro controller of each hub 330*a-d* being powered up and in normal operation to form the respective subnetworks 312, 314*a-c* but, at this time, the trailer order is unknown and the trailers 304*a-c* can be in any order. At step 604, each subnetwork 312, 314*a-c* monitors received signal strength indicators (RSSI) and ToF data from all other subnetworks 312, 314*a-c*. If other hubs were not present, the same data could come from range extenders or even directly from sensors.

At steps 606 and 608, the tractor hub 330*a* identifies a trailer subnetwork 314*a* with the highest RSSI and the shortest ToF. The trailer subnetwork 314*a* with the highest RSSI and shortest ToF should be the lead trailer 304*a* physically closest to the tractor 302. At step 610, the tractor hub 330*a* compares the subnetwork 314*a* identified with the highest RSSI to the subnetwork 314*a* with the shortest ToF. If the subnetworks of steps 606 and 608 do not match, meaning the subnetwork with the highest RSSI is different from the subnetwork with the shortest ToF, the method restarts at step 602. At step 612, if there is a match by both being subnetwork 314*a*, subnetwork 314*a* is identified as being on the first trailer 314*a* (e.g., the lead trailer). Further, if at step 610, there is only an RSSI and ToF from the same subnetwork 314*a*, then the tractor subnetwork 312 can identify the associated trailer 304*a* as the one and only trailer present.

After the lead trailer 304*a* is identified successfully, the lead trailer wireless hub 330*b* identifies the subnetwork 314*b* with the highest RSSI and the shortest ToF with respect thereto, excluding the tractor subnetwork 312 in both cases at steps 614 and 616. At step 618, if there is a match, then the respective subnetwork 314*b* is identified as the second trailer 304*b* immediately after the lead trailer 304*a* at step 620 as shown on FIG. 6*b*. If there is no match at step 618, the method restarts at step 602. In another embodiment, the method restarts at step 612 by using the previously established lead trailer identification. If at steps 614 and 616, there are only an RSSI and ToF from two subnetworks 314*a*, 314*b*, then the tractor subnetwork 312 can identify and order the associated two trailers 304*a*, 304*b*. In one embodiment, the process end after successful identification at step 620.

Once the second trailer 304*b* is identified, any of the hubs 330*a*, 330*b* or the trailer wireless hub 330*c* of the second trailer 304*b* can identify the third trailer 304*c*. To that end, in the following description the second trailer wireless hub 330*c* is used. At steps 622 and 624, the hub 330*c* identifies the subnetwork 314*c* with the highest RSSI and the shortest ToF excluding the tractor subnetwork 312 and the lead trailer subnetwork 314*a* in both cases. At step 626, if there is a match, it is assumed the identified subnetwork 314*c* corresponds to the third trailer 304*c* (i.e. the trailer 304*c* immediately after the second trailer 304*b*). The third trailer 304*c* is identified at step 628 based on the third trailer subnetwork 314*c*, as shown on FIG. 6*b*. If there is no match at step 626, the entire process is restarted at step 602 but may alternatively return to step 620.

The steps to identify the next trailer in a line of trailers can be repeated for additional trailers, as would be understood by one of skill in the art. Assuming the vehicle 300 has three trailers 304*a-c*, as in the example of FIG. 5, the first results ordering the three trailers 304*a-c* have then be determined at step 630, which indicate an initial order of all the trailers 304*a-c*. If at steps 622 and 624, there are only an RSSI and ToF from three subnetworks 314*a-c*, then the tractor subnetwork 312 can identify and order the associated three trailers 304*a*, 304*b* and end the method or proceed with a double check as follows. For more trailers, the method may continue.

After step 630 to double check, the process of determining the order of the trailers 304*a-c* is then substantially repeated, in reverse order, to get a second set of results for comparison to determine whether the initial ordering was accurate. In more detail, referring now to FIG. 6*c*, the method continues to monitor RSSI and ToF data from all other subnetworks 314*a-c* at step 632. At steps 634 and 636, starting with the identified third trailer 304*c*, the third trailer subnetwork 314*c* identifies the subnetwork 314*b* with the highest RSSI and the shortest ToF by comparing data from all of the identified subnetworks 312, 314*a-b*. At step 638, subnetwork(s) with the highest RSSI and the shortest ToF are compared. If the identified subnetworks with the highest RSSI and the shortest ToF are different, the method restarts to step 632, but if there is a match, then the identified subnetwork 314*b* is determined to correspond to the second trailer 304*b*. The identification of location of the second trailer 304*b* is saved as part of the second set of results at step 640.

At steps 642 and 644, the newly identified second trailer subnetwork 314*b* then identifies the highest RSSI and the shortest ToF excluding the third trailer subnetwork in both cases. At step 646, the second trailer subnetwork 314*b* compares the identified subnetworks, typically subnetwork 314*a* for each criteria. If there is a match, then the identified subnetwork (e.g., subnetwork 314*a*) is determined to correspond to the lead trailer 304*a* and saved as part of the second set of results at step 648. If the identified subnetworks are different at step 646, the method restarts at step 632.

Figure 6A:
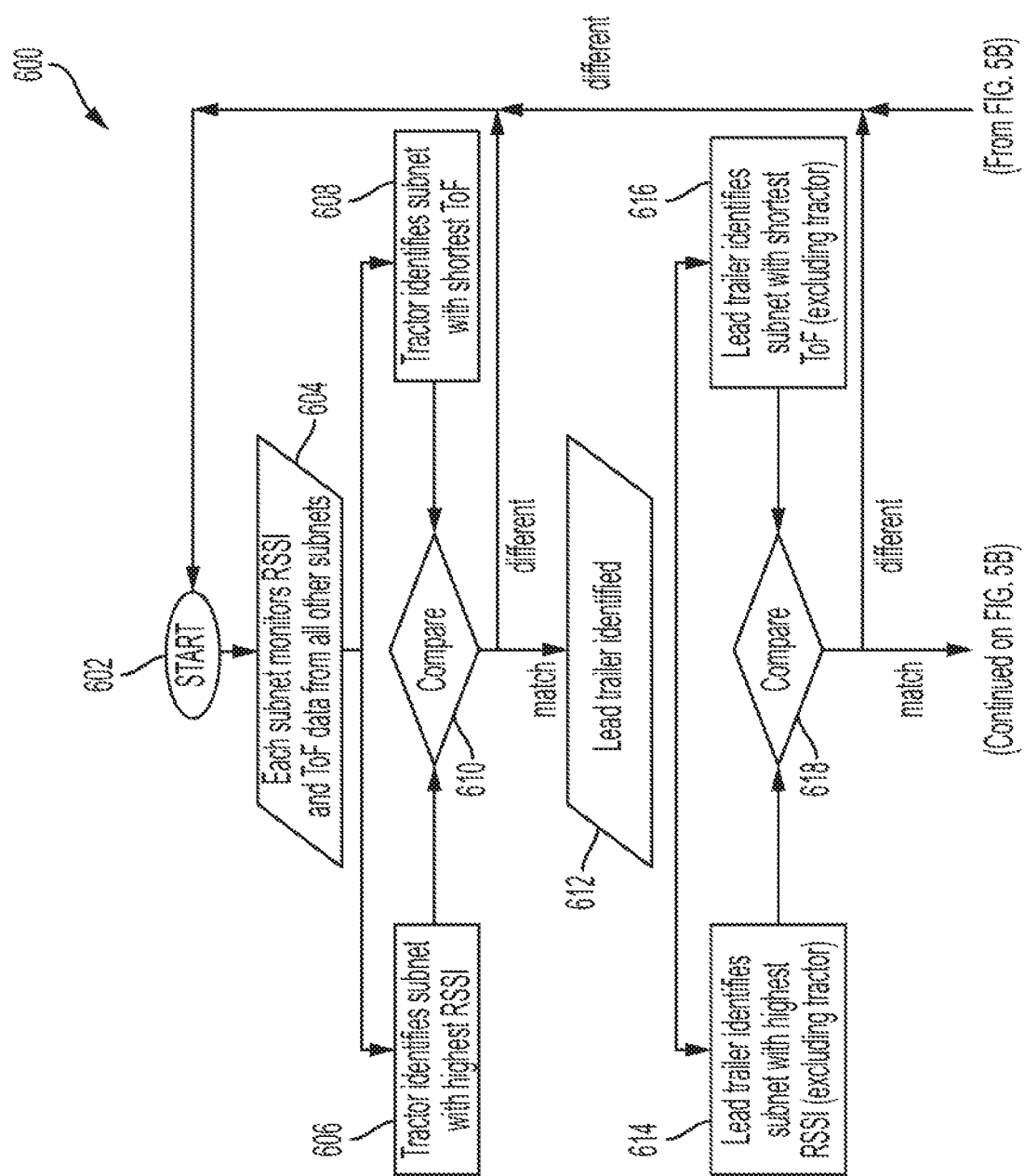
FIG. 6A is a portion of a flowchart for automatically ordering the trailers of the vehicle of FIG. 5 in accordance with the subject technology.
Figure 6B:
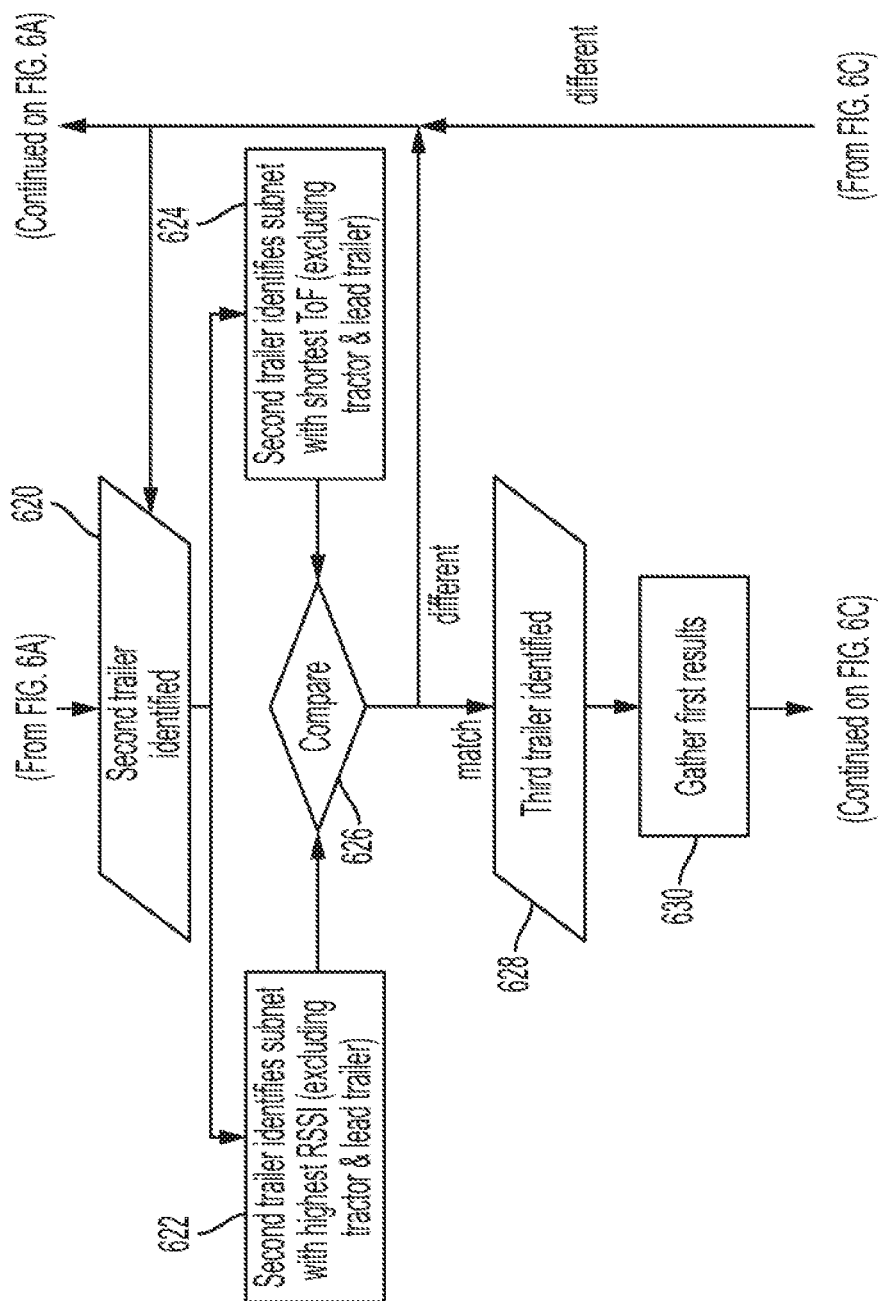
FIG. 6B is a portion of a flowchart for automatically ordering the trailers of the vehicle of FIG. 5 in accordance with the subject technology.
Figure 6D:
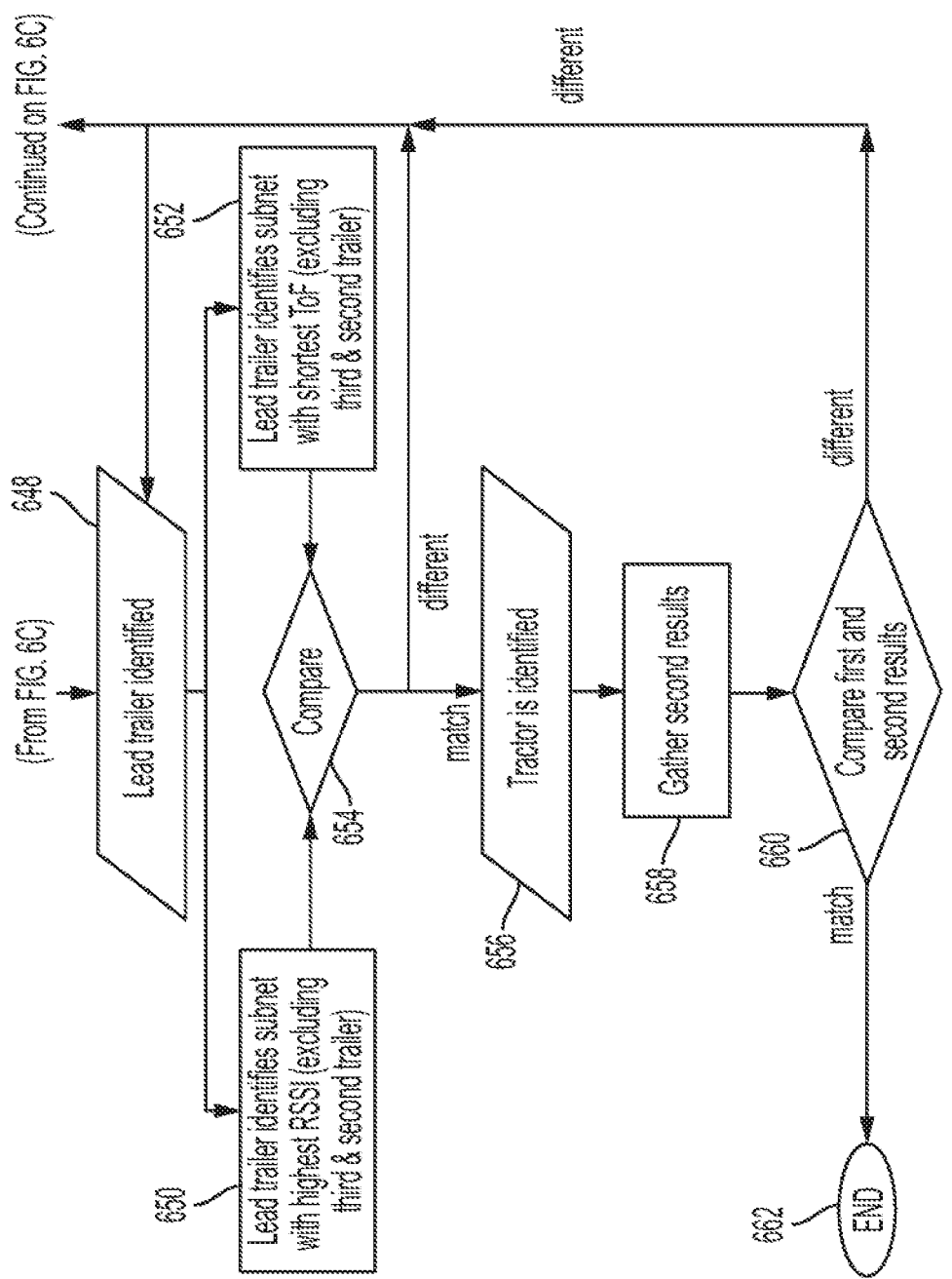
FIG. 6D is a portion of a flowchart for automatically ordering the trailers of the vehicle of FIG. 5 in accordance with the subject technology.

Referring now to FIG. 6*d*, the identified lead trailer subnetwork 314*a* then identifies the subnetwork with the highest RSSI and with the shortest ToF excluding the second and third trailer subnetworks 314*b-c*, in both cases at steps 650 and 652. At step 654, the lead trailer subnetwork 314*a* compares the identified subnetworks. If there is a match, properly being the tractor subnetwork 312, then the method proceeds to step 656 where the identified tractor subnetwork 312 is determined to correspond to the tractor 302. The method gathers and saves the information related to the three properly located subnetworks 312, 314a-b as part of the second set of results at step 658.

At step 660, with the subnetworks 312, 314a-b identified and ordered a second time, the first and second set of results are then compared. If the ordering determined in the first set of results is consistent with the ordering determined in the second set of results, then it is verified that order of the VAN subnetworks 312, 314a-c have been correctly determined and the method ends at step 662. Otherwise, if the order determined in the first and second set of results is different, then the method starts over at step 602 so a verified order can be determined.

In this way, the VAN 301 is able to automatically determine an order of the trailers 304a-c based on the order of the subnetworks 330b-d with no input from the user. The order of the trailers 304a-c can then be relied upon to determine where various sensors are located, and to easily take action based on a sensor readings and/or alert. For example, if a tire pressure monitoring sensor reports data that triggers a low pressure alert, it is advantageous for the user to be able to narrow down the potential tire(s) corresponding to that alert. A given sensor's subnet can be used to determine which trailer (or tractor) the sensor is a part of, based on the ordering of the trailers with no additional input needed from the user. Thus, if the pressure sensor reporting the alert is in the third trailer subnetwork 314c, the user can be alerted that a tire of the third trailer 304c has low pressure. This avoids the need for the user to spend time checking the tires for the tractor 302 or the other trailers 304a-b. This can be similarly used for readings and alerts for other known sensors as are known in the art.

It is also envisioned that the dollies 306 can have wireless hubs that form separate subnetworks rather than part of the trailer subnetworks 314b-c, respectively. In this instance, the dolly subnetworks would be similarly identified and ordered in the method of ordering the subnetworks. The process described herein can use shared specifications for standardized information. The shared specifications allow the process of linking trailers to the VAN 101, 301 and ordering the trailers to be easily carried out across multiple truck and trailer brands. Preferably, no secondary user action is required to determine the ordering of the trailers 104, 304. For example, the method for ordering the trailers 104, 304 can be activated upon making the electrical and/or pneumatic connections between the tractor 102, 302 and the trailers 104, 304, as well as between the trailers 104, 304. The method can also be triggered by using the smart device 275.

As would be understood by those of ordinary skill in the pertinent art, the subject technology has broad applicability. For example, the subject technology would work equally well on trains, trolley cars, and containers in shipyards and on large ships and the like. It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., modules, databases, interfaces, computers, servers and the like) shown as distinct for purposes of illustration may be incorporated within other functional elements in a particular implementation.

All patents, patent applications and other references disclosed herein are hereby expressly incorporated in their entireties by reference. While the subject technology has been described with respect to preferred embodiments, those skilled in the art will readily appreciate that various changes and/or modifications can be made to the subject technology without departing from the spirit or scope of the invention as defined by the appended claims.

What is claimed is:

1. A method for establishing a vehicle area network on a vehicle having a tractor with a tractor wireless hub, the tractor being connected to a first trailer having a first trailer wireless hub, the method comprising the steps of:
    activating the tractor hub and the first trailer wireless hub; and
    sharing credentials between the tractor wireless hub and the first trailer wireless hub in accordance with out of band pairing techniques,
    wherein the tractor wireless hub is activated by a key fob being in proximity to the tractor.

2. The method as recited in claim 1, wherein the first trailer wireless hub is activated by a power line connection or CAN connection being made between the tractor and the first trailer, and the credentials are shared autonomously via the power line connection.

3. The method as recited in claim 1, further comprising a step of using a pairing device to establish communication between the tractor wireless hub and a plurality of sensors on the tractor.

4. The method as recited in claim 3, further comprising a step of providing at least one transmitter/receiver for relaying signals from the plurality of sensors to the tractor wireless hub.

5. The method as recited in claim 1, wherein the vehicle area network includes a tractor subnetwork based on the tractor wireless hub and a first trailer subnetwork based on the first trailer wireless hub, wherein the tractor wireless hub acts as an access point for the vehicle area network.

6. The method as recited in claim 5, further comprising a step of coupling a second trailer to the first trailer, wherein the second trailer has a second trailer wireless hub that is activated upon a power line connection being made between the first and second trailers.

7. The method as recited in claim 6, further comprising of centralizing the access point based on having more than one trailer by:
    searching down a length of the vehicle to determine relative locations of the tractor wireless hub, the first trailer wireless hub and the second trailer wireless hub; determining a centrally located hub based on the locations; and establishing the centrally located hub as the access point.

8. The method as recited in claim 1, further comprising the steps of:
    establishing communication between the tractor wireless hub and a telematics device;
    establishing communication between a first plurality of sensors on a first tractor and the tractor wireless hub;
    establishing communication between a second plurality of sensors on the tractor and the tractor wireless hub; and
    processing data from the first and second plurality of sensors to determine proper action for the vehicle.

9. The method as recited in claim 8, wherein the proper action is selected from a group consisting of: displaying a warning on a dashboard in the tractor; changing a tire; modifying an autonomous control of the vehicle; and scheduling a maintenance appointment.

10. A tractor-trailer vehicle comprising:
    a tractor that having at least four tires, two of which can be turned to steer a direction of travel of the tractor;

a first wireless hub that is integrated with the tractor;
a trailer that is removably connected to the tractor, the trailer having a front portion that is adapted to connect to the tractor, and a rear portion with at least two tires;
a second wireless hub that is integrated with the trailer;
at least one tractor sensor that is integrated with the tractor;
at least one trailer sensor that is integrated with the trailer; and
a telematics module integrated with the trailer;
wherein:
the first wireless hub communicates with the second wireless hub by way of WiFi with a first network protocol, thereby establishing a first level of a vehicle area network (VAN) comprising the first wireless hub and the second wireless hub;
the first wireless hub establishes a first subnetwork in and around the tractor with a network protocol different than the first network protocol, and communicates with a first sensor of the at least one tractor sensor via the first subnetwork, the first subnetwork being within a second level of the VAN; and
the second wireless hub establishes a second subnetwork in and around the trailer with the network protocol different than the first network protocol, that is separate and distinct from the first subnetwork, and communicates with a second sensor of the at least one trailer sensor via the second subnetwork, the second subnetwork being within the second level of the VAN.

11. The tractor trailer of claim 10, wherein the at least one sensor that is integrated with the trailer comprises a tire-pressure-measurement sensor that is located inside one of the at least two tires and communicates data to the second wireless hub wirelessly.

12. The tractor trailer of claim 10, further comprising: a transmitter/receiver that is integrated with the trailer, and acts as a range extender for the at least one trailer sensor when the at least one trailer sensor and the second wireless hub communicate with one another.

13. The tractor trailer of claim 10, wherein the telematics module wirelessly connects to the either the second wireless hub on the trailer or the first wireless hub on the tractor and allows communication of data from any sensor on the VAN to external networks over a cell tower infrastructure.

14. A method for establishing a vehicle area network on a vehicle having a tractor with a tractor wireless hub, the tractor being connected to a first trailer having a first trailer wireless hub, the method comprising the steps of:
activating the tractor hub and the first trailer wireless hub;
sharing credentials between the tractor wireless hub and the first trailer wireless hub in accordance with out of band pairing techniques, wherein the vehicle area network includes a tractor subnetwork based on the tractor wireless hub and a first trailer subnetwork based on the first trailer wireless hub, wherein the tractor wireless hub acts as an access point for the vehicle area network;
coupling a second trailer to the first trailer, wherein the second trailer has a second trailer wireless hub that is activated upon a power line connection being made between the first and second trailers; and
centralizing the access point based on having more than one trailer by: searching down a length of the vehicle to determine relative locations of the tractor wireless hub, the first trailer wireless hub and the second trailer wireless hub; determining a centrally located hub based on the locations; and establishing the centrally located hub as the access point.

15. The method as recited in claim 14, wherein the first trailer wireless hub is activated by a power line connection or CAN connection being made between the tractor and the first trailer, and the credentials are shared autonomously via the power line connection.

16. The method as recited in claim 14, further comprising a step of using a pairing device to establish communication between the tractor wireless hub and a plurality of sensors on the tractor.

17. The method as recited in claim 16, further comprising a step of providing at least one transmitter/receiver for relaying signals from the plurality of sensors to the tractor wireless hub.

18. The method as recited in claim 14, further comprising the steps of:
establishing communication between the tractor wireless hub and a telematics device;
establishing communication between a first plurality of sensors on a first tractor and the tractor wireless hub;
establishing communication between a second plurality of sensors on the tractor and the tractor wireless hub; and
processing data from the first and second plurality of sensors to determine proper action for the vehicle.

19. The method as recited in claim 18, wherein the proper action is selected from a group consisting of: displaying a warning on a dashboard in the tractor; changing a tire; modifying an autonomous control of the vehicle; and scheduling a maintenance appointment.

* * * * *